United States Patent
Thomas et al.

(10) Patent No.: US 10,078,577 B2
(45) Date of Patent: Sep. 18, 2018

(54) POLICY COMPLIANCE OF CONTAINER IMAGES

(71) Applicant: HEWLETT PACKARD ENTERPRISE DEVELOPMENT LP, Houston, TX (US)

(72) Inventors: Kishan Thomas, Sunnyvale, CA (US); Dongye Pan, San Jose, CA (US); Hong Wong, Fremont, CA (US); Steven Lamdien Tran, San Jose, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 115 days.

(21) Appl. No.: 15/005,320

(22) Filed: Jan. 25, 2016

(65) Prior Publication Data

US 2017/0212830 A1 Jul. 27, 2017

(51) Int. Cl.
G06F 9/44 (2018.01)
G06F 11/36 (2006.01)

(52) U.S. Cl.
CPC ............... *G06F 11/3668* (2013.01)

(58) Field of Classification Search
None
See application file for complete search history.

(56) References Cited

U.S. PATENT DOCUMENTS

| | | | |
|---|---|---|---|
| 9,116,768 B1 * | 8/2015 | Sawhney | G06F 8/60 |
| 9,148,408 B1 | 9/2015 | Glazemakers et al. | |
| 2009/0165078 A1 * | 6/2009 | Samudrala | G06F 21/604 |
| | | | 726/1 |

OTHER PUBLICATIONS

<https://www.ng.bluemix.net/docs/containers/container_images_adding_ov.html>—Managing Images, IBM Bluemix, Retrieved from the Internet: [retrieved on Nov. 26, 2015], 15 pages.
Banyanops/Collector, Retrieved from the Internet: <https://hub.docker.com/r/banyanops/collector/> [retrieved on Nov. 26, 2015], 3 pages.
Goyal, P., VMware Security & Compliance Blog, VMware Blogs, May 6, 2015, 15 pages.
Hall, S., Docker Container Security: Signed, Sealed and Delivered From Vulnerabilities, Retrieved from the Internet: <http://thenewstack.io/3-new-security-features-docker/> [retrieved on Nov. 26, 2015], 7 pages.
Rashid, F.Y., Google Cloud Gains Security for Docker Containers, InfoWorld Tech Watch, Nov. 11, 2015, 5 pages.
SteveRob—https://footyntech.wordpress.com—Footy 'n' Tech where football and technology meet! Docker for Dummers posted Aug. 23, 2013 (8 pages).
Wikipedia, Docker (software) dated Jan. 9, 2016 (11 pages).
Wikipedia, lmctfy ("Let Me Contain That for You") dated Oct. 4, 2015 (2 pages).
Zhang, M., et al., Harbormaster: Policy Enforcement for Containers, Retrieved from the Internet: <http://seclab.cs.sunysb.edu/seclab/pubs/cloudcom15.pdf> [retrieved on Nov. 26, 2015], 8 pages.

* cited by examiner

*Primary Examiner* — Qamrun Nahar

(57) ABSTRACT

In some examples, a container image is received, where a container is to be launched from the container image. An executable process is deployable in the container to isolate the executable process from another executable process. The container image is annotated with metadata specifying a policy. Compliance of the container image with the policy is checked in a test environment prior to publication of the container image to a registry for use in a production environment.

19 Claims, 4 Drawing Sheets

---

RECEIVE A CONTAINER IMAGE FROM WHICH A CONTAINER IS TO BE LAUNCHED, AN EXECUTABLE PROCESS BEING DEPLOYABLE IN THE CONTAINER TO ISOLATE THE EXECUTABLE PROCESS FROM ANOTHER EXECUTABLE PROCESS, THE CONTAINER IMAGE ANNOTATED WITH METADATA SPECIFYING A POLICY — 102

CHECK COMPLIANCE OF THE CONTAINER IMAGE WITH THE POLICY IN A TEST ENVIRONMENT PRIOR TO PUBLICATION OF THE CONTAINER IMAGE TO A REGISTRY FOR USE IN A PRODUCTION ENVIRONMENT — 104

POLICY COMPLIANCE OF CONTAINER IMAGES

BACKGROUND

Executable code can be executed in a computer system as an executable process. The computer system can include an operating system that provides an operating environment in which the executable process is run. The executable process is able to access various resources of the computer system, including a processor, a memory, a storage device, an input/output (I/O) device, and so forth.

BRIEF DESCRIPTION OF THE DRAWINGS

Some implementations of the present disclosure are described with respect to the following figures.

DETAILED DESCRIPTION

Figure 1:
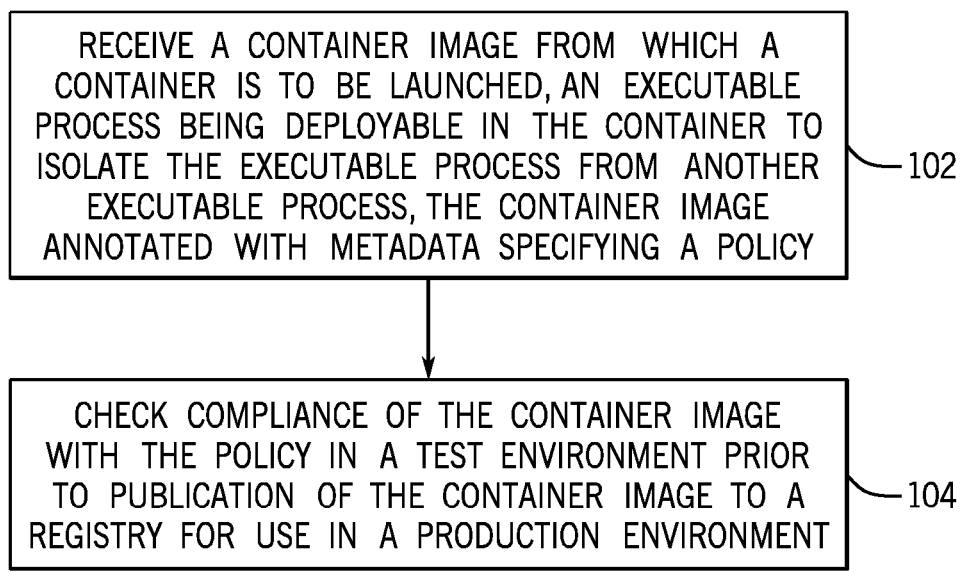
FIG. 1 is a flow diagram of an example process according to some implementations.

An executable process can be deployed in a container that is launched in a computer system (e.g. a desktop computer, a notebook computer, a tablet computer, a smart phone, a game appliance, a wearable device, a vehicle, etc.). A container can generally refer to a logical partition that isolates an executable process that is deployed in the container from another executable process that runs in the computer system (e.g. the other executable process can run in another container). An executable process can refer to an instance of executable code (including machine-readable instructions) that is executed by a processor (or multiple processors) in the computer system. In some examples, the executable code includes an application program. In other examples, the executable code can include other types of machine-readable instructions, such as an operating system, a driver, firmware, and so forth.

A container is launched from a container image. A container image can include information that relates to an executable code that is to be deployed in the container when launched, and information that relates to dependencies of the executable code. The dependencies of the executable code can include other code (e.g. a library, a routine, etc.) that the executable code uses during operation, files used by the executable code, and/or any other item on which the executable depends during execution of the executable code. The container image can also include configuration information for the executable code, where the configuration information specifies a configuration associated with the executable code. Examples of configurations can include any or some combination of the following: a port number with which the executable code is to communicate, a feature (e.g. a secure connection or other feature) that the executable code is to support, and other configurations. The container image may also include or be associated with other information, such as execution parameters that govern runtime characteristics of the container, such as selected resources of the computer system that the container has access to.

Launching a container from a container image can refer to causing deployment of a logical partition in a computer system in which the executable code specified by the container image is invoked, along with the dependencies of the executable code. Note that multiple container instances can be launched from the same container image.

Examples of containers can include "lightweight" containers, which are containers that do not include a guest operating system.

A lightweight container is different from a virtual machine, which also provides a logical partition within a computer system to provide isolation of an executable code executing in the virtual machine from another executable code in a computer system. A virtual machine includes a guest operating system in addition to executable code (e.g. an application) that executes in the virtual machine.

As used here, the term "container" can refer to a lightweight container and/or to a virtual machine.

In the ensuing discussion, reference is made to examples in which the executable code deployed in a container is an application program (or more simply, an "application"). However, it is noted that techniques or mechanisms according to some implementations of the present disclosure can be applied to other contexts where the executable code deployed in a container can be a different type of code.

Although reference is made to a container that includes an application, it is noted that in some examples, multiple different applications can be deployed in the container.

In a computer system in which multiple lightweight containers are launched, the applications deployed in such containers can share the operating system (or more specifically, a kernel of the operating system) of the computer system (also referred to as a "host operating system"). The applications in the lightweight containers are isolated from one another, but can share physical system resources (e.g. a processor, a memory, a storage device, an input/output (I/O) device, etc.) of the computer system. Lightweight containers can be launched in computer systems with various different operating systems, such as a Linux operating system, a WINDOWS operating system, and so forth.

Virtual machines can similarly share the physical system resources of a computer system. However, as noted above, virtual machines differ from lightweight containers in that the virtual machines include respective guest operating systems that are executed in the corresponding virtual machines.

A developer can build a container image, validate functionalities of the container image, and publish the container image into a registry (sometimes referred to as a "production registry"). Other operators (e.g. users or systems) can download container images from the registry to instantiate respective containers in corresponding systems. A registry can refer to a repository of container images that is accessible by operators to retrieve a container image to launch a container in a respective production environment, i.e. a computer system in which the application (or other executable code) of the container is executable during actual use of the application by an end user.

However, a developer of the container image may not understand how to check whether the container image is in compliance with a specified policy (or multiple specified policies). A policy can refer to a rule, or a collection of rules, that govern operation of a container launched from the container image. For example, an enterprise (e.g. a business concern, a government agency, an educational organization, or an individual) may specify that containers are to be compliant with a security policy or a network policy to prevent unauthorized or malicious behavior of the containers.

In cases where developers are unable to check whether container images are in compliance with a specified policy (or policies), the developers may publish container images into a registry without first checking whether the container images are in compliance. As used herein, checking to determine whether a container image is in compliance with a specified policy can refer to checking to determine whether the container image (or a container launched from the container image) is in compliance with one specified policy, or alternatively, with multiple specified policies. As a result, an operator that launches a container from a container image (in the registry) that has not yet been checked for compliance with a specified policy can cause execution of the container in a production environment that violates the specified policy.

In accordance with some implementations of the present disclosure, a compliance checker is provided to check compliance of a container image with a specified policy in a test environment, prior to publication of the container image to a registry for use in a production environment.

A production environment can refer to a computer system in which the application (or other executable code) of the container is executable during actual use of the application by an end user, as compared to use of the application (or other executable code) during development or testing of the container. A test environment, on the other hand, can refer to an environment that is separate and different from the production environment, and which is used for testing, either by the developer of a container image or by another entity, of a container image. A developer of a container image is an entity (e.g. a user or other type of entity) that creates or modifies a container image. Note that in some cases, a first container image can be built from a second container image, where the second container image is used as a template from which the first container image is built.

FIG. 1 is an example process that can be performed by a system according to some implementations. The system that can perform the process of FIG. 1 can include a computer or a distributed arrangement of computers. The process of FIG. 1 includes receiving (at 102) a container image from which a container is to be launched, where an executable process is deployable in the container to isolate the executable process from another executable process. The container image is annotated with metadata specifying a policy that the container image is to be compliant with. The term "metadata" can refer to information that can be associated with the container image. The metadata "specifying" a policy can refer to information including an identification of the policy, an identification of a location of the policy, or the policy itself. The container image being annotated with the metadata specifying a policy can refer to either embedding the metadata in the container image, or including information, in the container image, that refers to the policy (e.g. identifies a location of the policy). Note that the metadata that is annotated with the container image can specify one policy, or alternatively, multiple policies.

The process of FIG. 1 further includes checking (at 104) compliance of the container image with the policy in a test environment prior to publication of a container image to a registry for use in a production environment.

Figure 2:
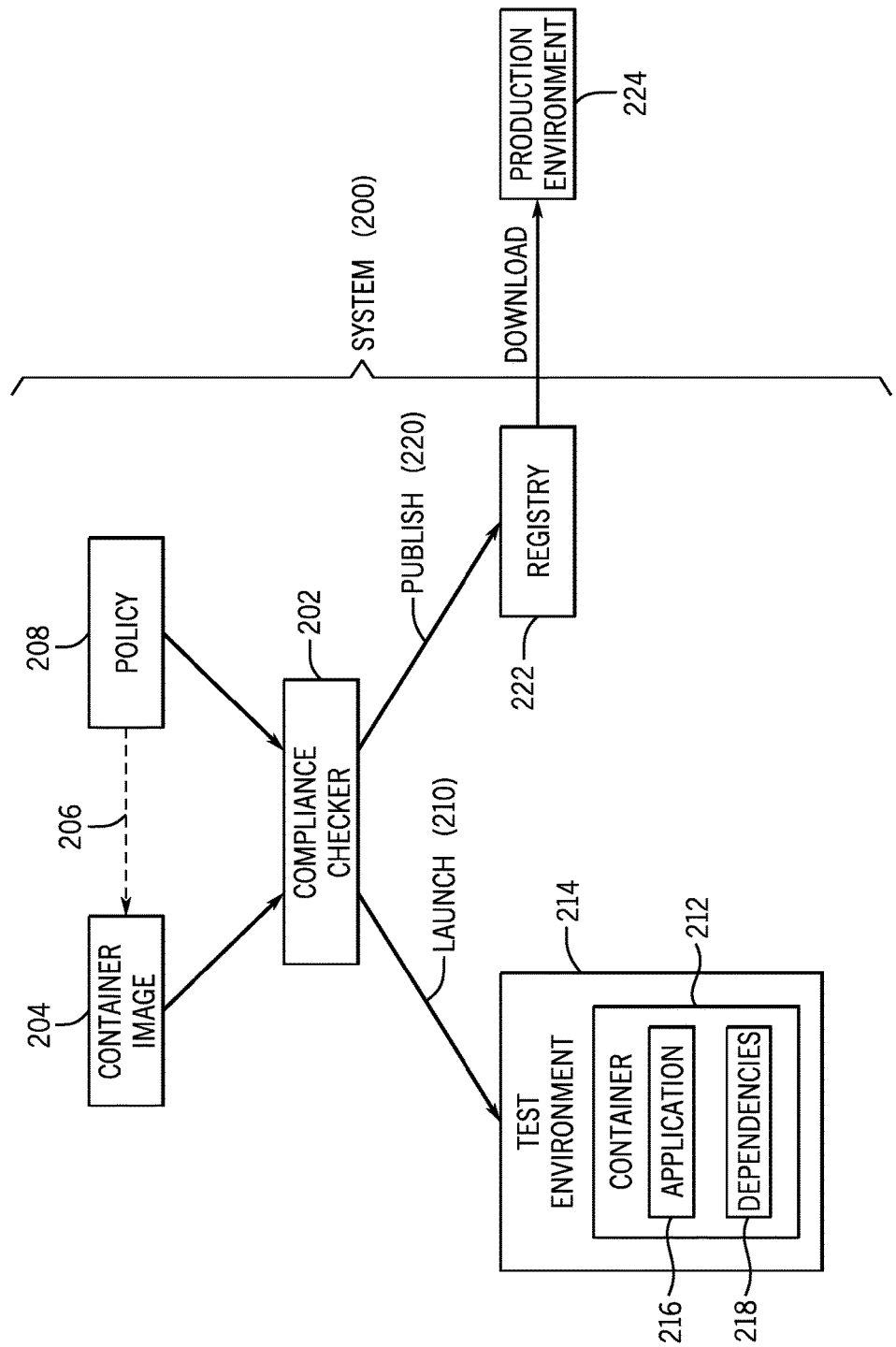
FIG. 2 is a block diagram of an example arrangement including a system that has a compliance checker according to some implementations.

FIG. 2 is a block diagram of an example arrangement that includes a system 200 coupled to a production environment 224 (that is separate from the system 200). The system 200 can be implemented as a computer or a distributed arrangement of computers. The system 200 includes a compliance checker 202, which can be implemented as a machine-readable instructions, or as a combination of machine-readable instructions and hardware processing circuitry in the system 200. The processing circuitry can include a microprocessor, a core of a multi-core microprocessor, a microcontroller, a programmable integrated circuit, a programmable gate array, or other hardware processing circuitry.

As shown in FIG. 2, a container image 204 can be annotated (at 206) with a policy 208. Although FIG. 2 shows the container image 204 being annotated with one policy 208, it is noted that in other examples, the container image 204 can be annotated with multiple policies. Also, although just one container image 204 is shown in FIG. 2, it is noted that in other examples, multiple container images can be provided to the system 200 for compliance checking by the compliance checker 202.

The compliance checker 202 is used to perform the checking of whether or not the container image 204 is in compliance with the policy 208. The compliance checker 202 performs the checking by launching (at 210) a container 212 in a test environment 214. The test environment 214 can be implemented with a sandbox server or other type of computing platform, where a container that is launched in the test environment 214 is isolated from other portions of the system 200. As shown in FIG. 2, the launched container 212 includes an application 216 that is deployed in the container 212, and dependencies of 218 of the application 216, where the dependencies 218 can include any or some combination of library, a file, and so forth, that are used by the application 216. Although just one application 216 is shown in the container 212, it is noted that multiple applications can be deployed in the container 212.

The compliance checker 202 determines whether the container 212 is in compliance with the policy 208. In some examples, the compliance checker 202 verifies that the launched container 212 is compliant with all rules defined in the policy 208. For example, a security policy can include a rule specifying that Hypertext Transfer Protocol (HTTP) ports have to run in HTTP Secure (HTTPS) mode. In this example, the compliance checker 202 can include a script or other mechanism that uses network commands to check that all HTTP ports open inside the launched container 212 are using HTTPS mode.

As part of checking the compliance of the container 212 with respect to the policy 208, the compliance checker 202 collects the results of the checking, and stores the results. The results can be output to another entity to allow the other entity to perform any remediation with respect to the container image 204, in cases where the compliance checking indicates that the container image 204 is not in compliance with the policy 208. Once the compliance checking of the container 212 is completed by the compliance checker 202, the compliance checker 202 can remove the container 212 (and the corresponding application 216) from the test environment 214.

If the compliance checker 202 determines that the container image 204 is in compliance with the policy 208, based on the checking of the container 212 launched in the test environment 214, the compliance checker 202 can publish (at 220) the container image 204 to a registry 222. Publishing the container image 204 to the registry 222 can refer to saving a copy of the container image 204 in the registry 222. The registry 222 is accessible by various operators to download any container image included in the registry 222, for launching a corresponding container in a production environment 224. The production environment 224 can be separate from the system 200. For example, the production environment 224 can include a user computer system.

If the compliance checker 202 determines that the container image 204 is not in compliance with the policy 208, based on the checking of the container 212 launched in the test environment 214, the compliance checker 202 can prevent the container image 204 from being published to the registry 222.

Figure 3:
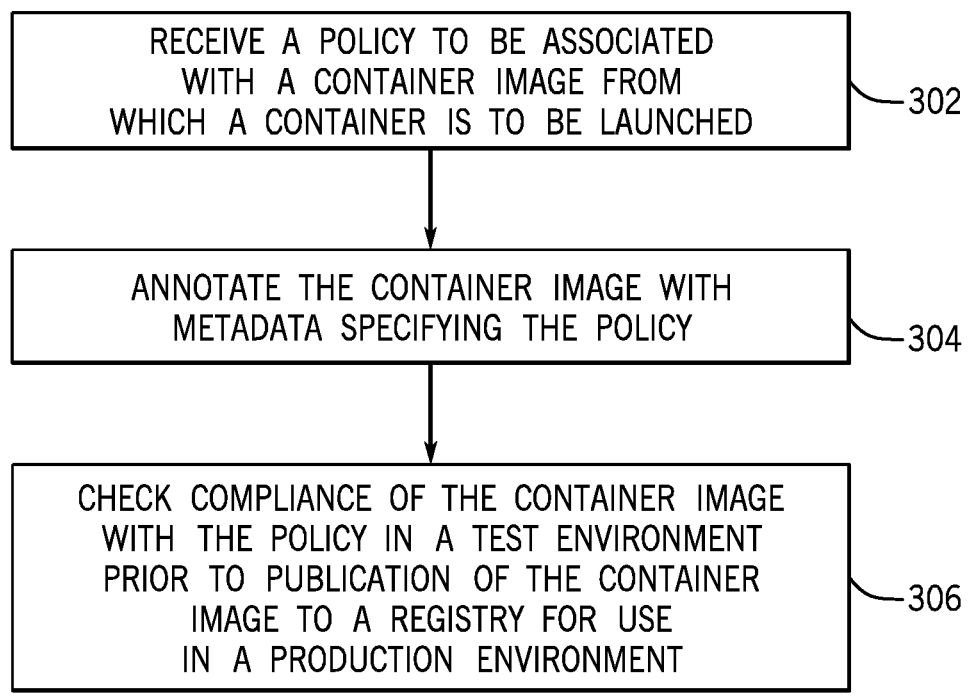
FIG. 3 is a flow diagram of another example process according to some implementations

FIG. 3 is a flow diagram of an example process that can be performed by a system, such as by the compliance checker 202 in the system 200. The process of FIG. 3 includes receiving (at 302) a policy to be associated with a container image from which a container is to be launched. The policy that is received can be based on user input that specifies an association of the policy with the container image. The receiving the policy can be part of an interactive manual procedure, or can be part of an automated procedure that is responsive to an event, such as an event relating to detection of a new container image that has been created.

The process further includes annotating (at 304) the container image with metadata specifying the policy. As shown in FIG. 2, the container image 204 annotated with the metadata specifying the policy 208 can be provided as input to the compliance checker 202.

The process of FIG. 3 further includes checking (at 306) compliance of the container image with the policy in a test environment prior to publication of the container image to a registry for use in a production environment.

Although the foregoing has referred to checking compliance of one container image with respect to a policy, it is noted that in other examples, a group of container images can be defined, and compliance of the group of container images with respect to a policy can be checked by the compliance checker 202.

Figure 4:
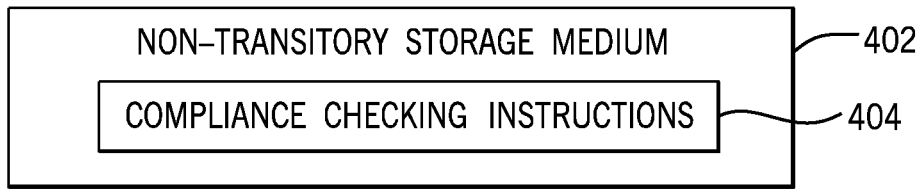
FIG. 4 is a block diagram of a non-transitory storage medium storing machine-readable instructions according to some implementations.

FIG. 4 is a block diagram of an example non-transitory computer-readable or machine-readable storage medium 402, which stores compliance checking instructions 404 that upon execution in a system (e.g., system 200 in FIG. 2) causes the performance of various actions, such as those depicted in FIG. 1 or 3, or other actions as described in the present disclosure. The compliance checking instructions 404 can be part of the compliance checker 202 of FIG. 2, in some examples.

Figure 5:
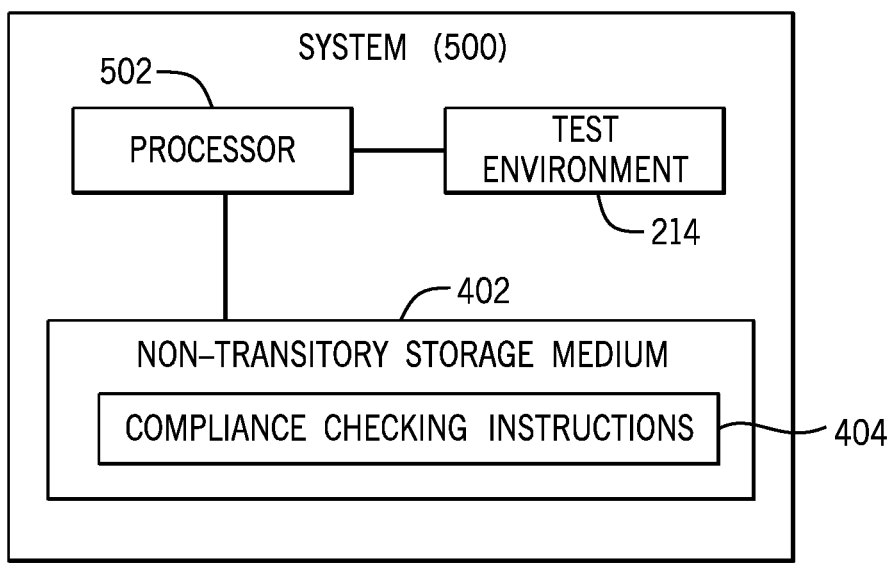
FIG. 5 is a block diagram of an example system according to some implementations.

FIG. 5 is a block diagram of an example system 500 that includes a processor 502 (or multiple processors), the test environment 214, and the non-transitory storage medium 402 that stores the compliance checking instructions 404 that upon execution by the processor(s) 502 cause the launching of a container from a container image in the test environment 214, determine whether the container launched in the test environment is in compliance with a policy, and in response to determining that the container is not in compliance with the policy, prevent publication of the container image to a registry from which the container image is accessible to launch the container in a production environment different from the test environment.

A processor can include a microprocessor, a core of a microprocessor, a microcontroller, a programmable integrated circuit, a programmable gate array, or other hardware processing circuitry. A storage medium can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a system comprising a processor, a container image from which a container is to be launched, an executable process being deployable in the container to isolate the executable process from another executable process, the container image annotated with metadata specifying a policy; and
checking, by the system, compliance of the container image with the policy in a test environment prior to publication of the container image to a registry for use in a production environment, wherein the checking comprises launching the container from the container image in the test environment, and checking compliance of the launched container in the test environment with the policy, wherein the test environment is separate from the production environment.

2. The method of claim 1, further comprising:
preventing publication of the container image to the registry in response to determining that the container image is not in compliance with the policy; and
publishing the container image to the registry in response to determining that the container image is in compliance with the policy.

3. The method of claim 1, wherein the container image includes information relating to the executable process, and information that relates to dependencies of the executable process.

4. The method of claim 1, wherein launching the container from the container image comprises causing deployment of a logical partition in the system, the executable process and the dependencies of the executable process deployed in the logical partition.

5. The method of claim 1, further comprising collecting a result of the checking and outputting the result for use in remediating the container image.

6. The method of claim 1, wherein the container is a lightweight container that includes the executable process but that is without any operating system in the lightweight container.

7. The method of claim 6, wherein the lightweight container is to share a host operating system with another lightweight container.

8. The method of claim 1, wherein the container image is part of a group of container images, and wherein the checking is performed to determine whether the group of container images is in compliance with the policy.

9. A system comprising:
a processor;
a test environment; and
a non-transitory storage medium storing policy checking instructions executable on the processor to:
launch a container from a container image in the test environment,
determine whether the container launched in the test environment is in compliance with a policy, and
in response to determining that the container is not in compliance with the policy, prevent publication of the container image to a registry from which the container image is accessible to launch the container in a production environment different from the test environment.

10. The system of claim 9, wherein the container image is annotated with metadata specifying the policy.

11. The system of claim 9, wherein the policy checking instructions are executable on the processor to:
publish the container image to the registry in response to determining that the container is in compliance with the policy.

12. The system of claim 9, wherein the container image is part of a group of container images, and wherein the policy checking instructions are executable on the processor to:
launch, in the test environment, containers from the container images in the group of container images, and
determine whether the containers launched in the test environment are in compliance with the policy.

13. The system of claim 9, wherein the container is a lightweight container that includes an application program but that is without any operating system in the lightweight container.

14. The system of claim 9, wherein the container is a virtual machine that includes a guest operating system.

15. The system of claim 9, wherein the container image includes information that relates to an executable code that is to be deployed in the container when launched, and information that relates to dependencies of the executable code, and
wherein launching the container comprises launching the executable code and the dependencies in the container.

16. A non-transitory machine-readable storage medium storing instructions that upon execution cause a system to:
receive a policy to be associated with a container image from which a container is to be launched, an executable process being deployable in the container to isolate the executable process from another executable process;
annotate the container image with metadata specifying the policy; and
check compliance of the container image with the policy in a test environment prior to publication of the container image to a registry for use in a production environment, wherein the checking comprises launching the container from the container image in the test environment, and checking compliance of the launched container in the test environment with the policy, wherein the test environment is separate from the production environment.

17. The non-transitory machine-readable storage medium of claim 16, wherein the instructions upon execution cause the system to:
prevent publication of the container image to the registry in response to determining that the container image is not in compliance with the policy; and
publish the container image to the registry in response to determining that the container image is in compliance with the policy.

18. The non-transitory machine-readable storage medium of claim 16, wherein the policy is received based on user input.

19. The non-transitory machine-readable storage medium of claim 16, wherein the annotating comprises embedding the metadata in the container image or providing information in the container image that refers to the metadata.

* * * * *